US009222010B2

(12) United States Patent
Porcherie et al.

(10) Patent No.: US 9,222,010 B2
(45) Date of Patent: *Dec. 29, 2015

(54) PUMPABLE GEOPOLYMERS COMPRISING A MIXING AID AND DISPERSING AGENT

(75) Inventors: Olivier Porcherie, Paris (FR); Elena Pershikova, Paris (FR); Gaetan Rimmele, Cedex (FR); Hafida Achtal, Argenteuil (FR); Yamina Boubeguira, les Moullneaux (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 588 days.

This patent is subject to a terminal disclaimer.

(21) Appl. No.: 13/511,644

(22) PCT Filed: Nov. 10, 2010

(86) PCT No.: PCT/EP2010/006956
§ 371 (c)(1),
(2), (4) Date: Sep. 4, 2012

(87) PCT Pub. No.: WO2011/072784
PCT Pub. Date: Jun. 23, 2011

(65) Prior Publication Data
US 2012/0318175 A1 Dec. 20, 2012

(30) Foreign Application Priority Data
Dec. 17, 2009 (EP) .................... 09179722

(51) Int. Cl.
| C04B 24/10 | (2006.01) |
| C04B 16/02 | (2006.01) |
| C09K 8/08 | (2006.01) |
| C09K 8/10 | (2006.01) |
| C09K 8/42 | (2006.01) |
| C04B 28/00 | (2006.01) |
| C09K 8/467 | (2006.01) |
| C04B 103/44 | (2006.01) |
| C04B 111/00 | (2006.01) |

(52) U.S. Cl.
CPC ............... C09K 8/42 (2013.01); C04B 28/006 (2013.01); C09K 8/467 (2013.01); *C04B 2103/44* (2013.01); *C04B 2111/00293* (2013.01); *Y02W 30/92* (2015.05); *Y02W 30/94* (2015.05)

(58) Field of Classification Search
CPC ...... C04B 24/10; C04B 12/005; C04B 16/02; C09K 8/08; C09K 8/10

USPC .................................. 106/729, 730; 166/293
See application file for complete search history.

(56) References Cited

U.S. PATENT DOCUMENTS

| 4,509,985 A | 4/1985 | Davidovitz et al. |
| 4,859,367 A | 8/1989 | Davidovitz |
| 5,349,118 A | 9/1994 | Davidovits |
| 5,356,579 A | 10/1994 | Jennings et al. |
| 5,539,140 A | 7/1996 | Davidovitz |
| 5,626,665 A | 5/1997 | Barger et al. |
| 5,635,292 A | 6/1997 | Jennings et al. |
| 5,637,412 A | 6/1997 | Jennings et al. |
| 5,788,762 A | 8/1998 | Barger et al. |
| 8,535,437 B2* | 9/2013 | Pershikova et al. ........... 106/729 |
| 2007/0015678 A1 | 1/2007 | Rodrigues et al. |
| 2007/0221100 A1 | 9/2007 | Kumar et al. |
| 2008/0028994 A1 | 2/2008 | Barlet-Gouedard et al. |
| 2012/0267106 A1* | 10/2012 | Pershikova et al. ........... 166/285 |

FOREIGN PATENT DOCUMENTS

| EP | 1887065 | 11/2010 |
| WO | 2005/019130 | 3/2005 |
| WO | 2008/017413 | 2/2008 |
| WO | 2008/017414 | 2/2008 |

OTHER PUBLICATIONS

J. Davidovits, "Synthesis of new high-temperature Geo-polymers for reinforced plastics/composites," SPE PACTEC '79, Costa Mesa, California, Society of Plastics Engineers USA, 1979, pp. 151-154.
M. Palacios, F Puertas,, "Effect of superplasticizer and shrinkage-reducing admixtures on alkali-activated slag pastes and mortars", Cement and Concrete Research; 2005; 35 (7), pp. 1358-1367.
Proceedings of the conference "Alkali-activated materials—Research, production and utilization", Jun. 21-22, 2007, Prag, 493-507.
Proceedings of the conference "Geopolymer, green chemistry and sustainable development solutions", Jun. 29-30, 2005, Saint-Quentin, pp. 65-68.

* cited by examiner

*Primary Examiner* — Paul Marcantoni
(74) *Attorney, Agent, or Firm* — Jeremy D. Tillman; Rachel E. Greene; Tim Curington

(57) ABSTRACT

The invention concerns the use of a carbohydrate-based compound as a mixing aid and dispersing agent in a pumpable geopolymeric suspension for oil and/or gas industry applications, said suspension further comprising an aluminosilicate source, a carrier fluid, and an activator, and method for placing such a suspension in a borehole. In particular, the suspension according to the invention is used for well primary cementing operations and/or remedial applications.

13 Claims, No Drawings

PUMPABLE GEOPOLYMERS COMPRISING A MIXING AID AND DISPERSING AGENT

FIELD OF THE INVENTION

The present invention broadly relates to pumpable geopolymer formulations or suspensions, and their uses for oil and/and or gas industry applications.

DESCRIPTION OF THE PRIOR ART

Geopolymers are a novel class of materials that are formed by chemical dissolution and subsequent recondensation of various aluminosilicate oxides and silicates to form an amorphous three-dimensional framework structure. The term geopolymer was proposed and first used by J. Davidovits (Synthesis of new high-temperature geo-polymers for reinforced plastics/composites, SPE PACTEC' 79, Society of Plastics Engineers) in 1976 at the IUPAC International Symposium on Macromolecules held in Stockholm. Other terms have been used to describe materials synthesized utilizing a similar chemistry, such as alkali-activated cement, geocement, alkali-bonded ceramic, inorganic polymer, hydroceramic. In the following description, the term geopolymer will be used.

Geopolymers based on alumino-silicates are generally designated as poly(sialate), which is an abbreviation for poly (silicon-oxo-aluminate) or $(-Si-O-Al-O-)_n$ (with n being the degree of polymerization). The sialate network consists of $SiO_4$ and $AlO_4$ tetrahedra linked alternately by sharing all the oxygens, with $Al^{3+}$ and $Si^{4+}$ in IV-fold coordination with oxygen. Positive ions ($Na^+, K^+, Li^+, Ca^{2+}, \ldots$) must be present in the framework cavities to balance the charge of $Al^{3+}$ in IV-fold coordination.

The empirical formula of polysialates is: $M_n \{-(SiO_2)_z - AlO_2\}_n$, w $H_2O$, wherein M is a cation such as potassium, sodium or calcium, n is a degree of polymerization and z is the atomic ratio Si/Al which may be 1, 2, 3 or more, until 35 as known today.

The three-dimensional network (3D) geopolymers are summarized in the table below.

TABLE 1

Geopolymers chemical designation (wherein M is a cation such as potassium, sodium or calcium, and n is a degree of polymerization)

| Si/Al ratio | Designation | Structure | Abbreviations |
|---|---|---|---|
| 1 | Poly(sialate) | $M_n(-Si-O-Al-O-)_n$ | (M)-PS |
| 2 | Poly(sialate-siloxo) | $M_n(-Si-O-Al-O-Si-O)_n$ | (M)-PSS |
| 3 | Poly(sialate-disiloxo) | $M_n(-Si-O-Al-O-Si-O-Si-O-)_n$ | (M)-PSDS |

The properties and application fields of geopolymers will depend principally on their chemical structure, and more particularly on the atomic ratio of silicon versus aluminum. Geopolymers have been investigated for use in a number of applications, including as cementing systems within the construction industry, as refractory materials, as coatings, as ceramic precursors and as encapsulants for hazardous and radioactive waste streams. Geopolymers are also referenced as rapid setting and hardening materials. Compared to conventional Portland cement, they typically exhibit superior hardness and chemical stability.

First step of geopolymer synthesis involves the suspension of solid raw materials, such as the above mentioned aluminosilicates, into a carrier fluid. The fluid-to-solid ratio of this suspension affects properties of the suspension, such as for example, its viscosity and hardening time, and the properties of the hardened material obtained from the same suspension. Adjustment of the viscosity of this geopolymeric suspension without altering the other properties is critical in many applications such as the homogeneous coating thickness, the molding of ceramics pieces or the placement of the cement in building structure or in well cementing.

Well cementing, in particular, implies the control of the viscosity of the suspension at various temperatures encountered by the fluid in order to achieve a good placement of the fluid, while the fluid-to-solid ratio affects other critical parameters of well cementing operation such as for example the density of the suspension, the permeability and the mechanical properties of the hardened material.

Different prior art documents disclose the use of geopolymer compositions in the construction industry. In particular U.S. Pat. No. 4,509,985 discloses a mineral polymer composition employed for the making of cast or molded products at room temperatures, or temperatures generally up to 120° C.; U.S. Pat. No. 4,859,367, U.S. Pat. No. 5,349,118 and U.S. Pat. No. 5,539,140 disclose a geopolymer for solidifying and storing waste material in order to provide the waste material with a high stability over a very long time, Comparable to certain archeological materials, those waste materials can be dangerous and even potentially toxic for human beings and the natural environment; U.S. Pat. No. 5,356,579, U.S. Pat. No. 5,788,762, U.S. Pat. No. 5,626,665, U.S. Pat. No. 5,635, 292 U.S. Pat. No. 5,637,412 and U.S. Pat. No. 5,788,762 disclose cementitious systems with enhanced compressive strengths or low density for construction applications. WO2005019130 highlights the problem of controlling the setting time of the geopolymer system in the construction industry.

More recently WO2008017414 A1 and WO2008017413 A1, describe application of geopolymers for the oilfield industry. These documents state that, besides rapid strength development required in construction application, cementing oilfield application requires the control of other properties such as the mixability, pumpability, stability, thickening and setting times for large temperature and density ranges of geopolymer slurries. Additives controlling the thickening and setting times, such as accelerators or retarders, are described in these documents.

Fluid content, or more generally water content, influences rheological properties of the slurry. However, high water content decreases the stability and delays the thickening and the setting time of the suspension, which is not compatible with the well cementing at different temperatures. Furthermore, it affects the density of the slurry, which is not compatible with well cementing where the density of the suspension is imposed by the geological environment. Use of rheology-controlling additives, referenced either as a mixing aid and/or dispersing agent, a dispersant or a superplasticizer are therefore recommended, or even necessary in many cases. These documents describe pumpable geopolymeric suspensions, where the mixing aid and dispersing agent is the silicate, which is one component of the geopolymer suspension.

SUMMARY OF THE INVENTION

One of the goals is to propose settable geopolymer compositions with at least one additive that can further act as a water-reducing agent in geopolymer-based suspensions, and enhance the strength (by increasing the Solid Volume Fraction) and durability as well as decrease the permeability of hardening products produced from this suspension.

A further goal is to propose such an additive that can adjust the viscosity of the geopolymer in a broad temperature range so as to facilitate the works at the sites of handling the same and to allow placement in a wellbore.

Yet a further goal is to propose such an additive that is able to modify the rheological properties of the geopolymer composition even in alkaline media.

Thus, according to a first aspect, Embodiments concern methods of using of a carbohydrate-based compound as mixing aid and dispersing agents in a pumpable geopolymeric suspension further comprising an aluminosilicate source, a carrier fluid, and an activator.

The aluminosilicate source is preferentially selected from the group consisting of clays, dehydrated clays, dehydrated kaolins, fly ashes, blast-furnace slags, natural and synthetic zeolites, feldspars, dehydrated feldspars, alumina and silica sols, aluminum silicate and silica ceramic products, or a mixture thereof.

The carrier fluid is preferentially selected from the group consisting of fresh water, sea water, brines, re-cycled water or recuperated water, and mixtures thereof.

The activator is preferentially alkaline and, more preferentially, a silicate, a metal aluminate, a alkali-metal hydroxide, ammonium hydroxide, a alkaline earth metal hydroxide, sodium carbonate or a mixture thereof.

Preferably, the temperature of use of the pumpable geopolymeric suspension is comprised between 4° C. and 150° C., more preferably between 20° C. and 85° C.

In embodiments, the carbohydrate-based compound is a monomer. In further embodiments, the carbohydrate-based compound is a dimer. In yet further embodiments, the carbohydrate-based compound is a polymer.

For example, the carbohydrate-based compound is a pure compound, or a saccharide derivatives, or bond chemically to a molecule, and/or one component of a formulation containing various additives. Saccharides, saccharides derivatives and salts thereof are preferred dispersing agent in the present context.

Preferably, the concentration of the carbohydrate-based compound is from 0.03% to 10% by weight of aluminosilicate. More preferably, the concentration of the carbohydrate-based compound is from 0.04% to 5% by weight of aluminosilicate. Even more preferably the concentration of the carbohydrate-based compound is from 0.05% to 3% by weight of aluminosilicate. Most preferably the concentration of carbohydrate-based compound is from 0.06% to 2% by weight of aluminosilicate.

Embodiments concern methods to place such a suspension in a borehole, wherein the method comprises a first step which consists either in (i) predissolving the carbohydrate-based compound in the carrier fluid or in (i') blending the carbohydrate-based compound with the aluminosilicate source. Optionally, the carrier fluid comprises the predissolved activator. Optionally, the aluminosilicate source comprises pre-blended activator.

The method comprises advantageously the step of: (ii) pumping said suspension into the borehole, and (iii) allowing said suspension to set under wellbore downhole conditions.

Preferably, the suspension is used for primary operations and/or remedial applications.

DETAILED DESCRIPTION OF THE INVENTION

Embodiments relate to a mixing aid and dispersing agent that provides settable geopolymeric suspension with improved mixing properties to facilitate the works at the sites of handling the same and controlled rheological properties when using this suspension at different temperatures between 4° C. and 150° C., preferably between 20° C. and 85° C. The dispersing agent comprises a carbohydrate-based compound such as a saccharide and derivatives. The settable geopolymeric suspension comprises an aluminosilicate, a carrier fluid, an alkaline activator (as for example a alkali-metal silicate, metal aluminate, a alkali-metal hydroxide, an ammonium hydroxide, a alkaline earth metal hydroxide, sodium carbonate or a combination thereof), and if necessary, other additives used by people from the art for controlling properties of the well cementing slurries such as accelerator, weighting agents, retarder, fluid loss agent, gas generating agents, organic and inorganic fillers, etc. Settable means that by action of the activator, the suspension reacts chemically and sets into a hard material.

Carbohydrate-based compound used as mixing aid and dispersing agents includes monomer with different sizes, such as for example xylose or glucose (respectively five- and six-atoms rings); dimer such as for example sugar or small oligomer; and polysaccharide. The dispersing agent also comprises modified saccharides, such as their derivatives (example of sodiumgluconate, calciumglucoheptonate) or more complex saccharides modified with different chemical moieties. It can be used as a pure compound in solid form or in solution, or as component incorporated inside a formulated product.

Even if the mixing aid and dispersing agent can be used for all settable geopolymeric suspensions, present embodiments relate more particularly to geopolymer suspensions used for cementing subterranean wells. The geopolymer suspensions used in connection with cementing subterranean wells preferably have a viscosity equal or less than 300 cP; which corresponds to the maximum viscosity for the suspension to be pumpable.

Mixing aid and dispersing agents are used to enhance mixing properties of solid particles in a liquid fluid. Increasing the wettability of the solid particles allows more rapid mixing of the solid particles within the liquid fluid, and therefore accelerates the preparation of the suspension. This property is necessary during the preparation of the suspension, such as mix-on-the-fly slurry preparation well known by the people skilled in the art of well cementing. Furthermore, by increase wettability of the particles, less energy is required, and temperature increase of the suspension is reduced.

Mixing aids and dispersing agents are used to reduce the apparent viscosities of the suspension in which they are utilized. The addition of mixing aids and dispersing agents facilitates the mixing of the geopolymeric compositions and reduces the water required for geopolymer suspensions. The reduction of the viscosity allows the geopolymeric suspension to be pumped with less friction pressure and utilizing less pump horsepower. If used as a displacement fluid to remove the drilling mud from the wellbore, density and rheological properties of the geopolymer suspension has to be selected and controlled to provide optimum displacement regime. Density control is further mandatory for avoiding formation damage and fluid invasion of the wellbore from the formation.

Embodiments relate to methods of adding carbohydrate-based compound, i.e. saccharide-based compound, into settable geopolymer suspensions to provide suspensions with improved mixing properties and controllable rheological properties. Examples of suitable carbohydrate-based compounds include, but are not limited to, saccharides, that are natural or not, their derivatives and the salts of said saccharides or said derivatives, including salts that are soluble in an aqueous liquid, and mixtures thereof. Geopolymer suspensions contain at least an aluminosilicate source in a carrier fluid, which reacts in alkaline conditions (such as for example, but not limited to, an activator made of alkali-metal hydroxide or silicate and mixtures thereof) to form a hard material. Examples of geopolymer compositions for oilfield cementing applications have been described in WO2008017414 A1 and WO2008017413 A1. In particular, these documents provide compositions of such fluid, the nature of the aluminosilicate source, the nature of the carrier fluid and the nature of the activators, the nature of additives used to control the suspension's properties and the mixing processes to provide geopolymer suspensions which set after placement downhole.

Preferably, the concentration of the carbohydrate-based compound is from 0.03% to 10% by weight of aluminosilicate. More preferably, the concentration of the carbohydrate-based compound is from 0.04% to 5% by weight of aluminosilicate. Even more preferably the concentration of the carbohydrate-based compound is from 0.05% to 3% by weight of aluminosilicate. Most preferably the concentration of carbohydrate-based compound is from 0.06% to 2% by weight of aluminosilicate.

Examples of carbohydrate-based compounds include, but are not limited to, monosaccharides with different numbers of carbon atoms, such as pentose, hexose or heptose, either cyclized or opened and their derivatives such as sodiumgluconate.

In the following description, all mixing procedures and measurements of rheological properties after mixing, after conditioning at 25° C., gel strength evaluation and stability were made according to ISO 10426-2 standard procedures unless state the contrary. Rheometers used were also the ones recommended by ISO 10426-2 standard.

Table 2 and Table 3 hereunder illustrates that addition of monosaccharide improves the mixability of the geopolymeric suspension and, in particular, provides settable suspensions having rheological properties and stability required for cementing subterranean zones. Indeed, suspensions without mixing aids (samples A1 and A4) were difficult to mix and their rheological properties were not measurable due to their high pasty consistency. At the opposite, the same geopolymeric suspensions containing monosaccharide were easy to mix and their rheological properties were measured. Samples A2 and A3 were prepared by adding respectively 1% BWOA of xylose or glucose into sample A1. Samples A5 and A6 were prepared by adding respectively 1% BWOA of glucose or sodium gluconate into sample A4.

TABLE 2

Influence of monosaccharide on the mixing and rheological properties of geopolymeric suspensions at a bottom hole circulating temperature of 25° C.

| | Sample | | |
|---|---|---|---|
| | A1 | A2 | A3 |
| Monosaccharide | — | Xylose | Glucose |
| Rheology after mixing | | | |
| PV [cP] | n.m.* | 85 | 87 |
| Ty [lbf/100 sqrft] (Pa) | n.m.* | 14.5 (6.94) | 17.5 (8.38) |
| Rheology after conditioning | | | |
| PV [cP] | n.m.* | 112 | 135 |
| Ty [lbf/100 sqrft] (Pa) | n.m.* | 8.7 (4.16) | 8.9 (4.26) |
| Gel strength | | | |
| 10-second gel [lbf/100 sqrft] (Pa) | n.m.* | 10 (4.79) | 12.8 (6.13) |
| 10-min gel [lbf/100 sqrft] (Pa) | n.m.* | 51 (24.42) | 40.5 (19.39) |
| 1-min stirring [lbf/100 sqrft] (Pa) | n.m.* | 39 (18.67) | 16 (7.66) |
| Free fluid [mL] | n.m.* | 0 | 0 |

*n.m stands for "Not Measureable" because the suspension was pasty

Sample A1 was prepared by adding the blend comprising 650 g of class C fly ash and 62 g of sodium disilicate into 397 g of a solution made of water and 84 g of NaOH. Rheological properties after mixing, after conditioning at 25° C., gel strength evaluation and stability were not measurable on sample A1 because of its paste consistency.

Sample A2 was prepared by adding the blend comprising 650 g of class C fly ash and 62 g of sodium disilicate into 397 g of a solution made of water, 84 g of NaOH and 6.5 g of xylose. Rheological properties after mixing, after conditioning at 25° C., gel strength evaluation and stability we measured on sample A2.

Sample A3 was prepared by adding the blend comprising 650 g of class C fly ash and 62 g of sodium disilicate into 397 g of a solution made of water, 84 g of NaOH and 6.5 g of glucose. Rheological properties after mixing, after conditioning at 25° C., gel strength evaluation, stability (free fluid and sedimentation tests) were measured on sample A3. After set, no sedimentation was measured (difference between top and bottom was below 0.1 lb/gal (11.98 g/L)). Furthermore, thickening time was performed according to the API schedule 9.2 (recommended practice 10B, 1997) in a pressurized consistometer. The suspension reached 100 Bc (Bearden consistency) after 4 h 55 min, which showed that the suspension sets under downhole conditions. In particular, it showed that it can be applicable in well cementing.

TABLE 3

Effect of the monosaccharide on the rheological properties of geopolymeric suspensions containing after mixing

| | Sample | | |
|---|---|---|---|
| | A4 | A5 | A6 |
| Monosaccharide | — | Glucose | Sodiumgluconate |
| Rheology after mixing | | | |
| PV [cP] | 84 | 54 | 54 |
| Ty [lbf/100 sqrft] (Pa) | 55 (26.33) | 9.5 (4.55) | 5.4 (2.58) |

Sample A4 was prepared by adding the blend comprising 650 g of class C fly ash and 62 g of sodium disilicate into 375 g of a solution made of water and 57 g of NaOH. Rheological properties of sample A4 were measured after mixing.

Sample A5 was prepared by adding the blend comprising 650 g of class C fly ash and 62 g of sodium disilicate into 375 g of a solution made of water, 57 g of NaOH and 6.5 g of glucose. Rheological properties of sample A4 were measured after mixing.

Sample A6 was prepared by adding the blend comprising 650 g of class C fly ash and 62 g of sodium disilicate into 375 g of a solution made of water, 57 g of NaOH and 6.5 g of sodium gluconate. Rheological properties of sample A4 were measured after mixing.

Examples of carbohydrate-based compound also include polysaccharides, from dimer to polymer with longer chain. Preferred disaccharides are sucrose, lactose, maltose or cellubiose and mixtures thereof. Table 4 hereunder illustrates that the addition of small polysaccharide, such as dimer, provides mixable and settable suspensions having rheological properties required for cementing subterranean zones. Indeed, the suspension without additive was difficult to mix and its rheological properties were not measurable due to its high pasty consistency (sample B1), while samples B2, prepared by adding 1% BWOA of sugar into sample B1, was easier to mix and its rheological properties could be measured, and were compatible with well cementing applications. Table 5 hereunder illustrates that addition of long polysaccharides their derivatives and salts of their derivatives, having preferably a molecular weight from 5000 to 1000000 g/mol, provides mixable and settable suspensions having different molar compositions and rheological properties and stability required for cementing subterranean zones. Rheological properties of the suspension without additive (sample B3) could not be measured, because of its pasty consistency, while the one of samples B4, prepared by adding 1.1% BWOA of sucrose into sample B3, were measured and were compatible with well cementing applications.

TABLE 4

Effect of adding 1% BWOA of sugar into a geopolymeric suspension

| | Sample | |
|---|---|---|
| | B1 | B2 |
| Monosaccharide | — | sucrose |
| Rheology after mixing | | |
| PV [cP] | n.m.* | 108 |
| Ty [lbf/100 sqrft] (Pa) | n.m.* | 11.7 (5.6) |
| Rheology after conditioning | | |
| PV [cP] | n.m.* | 212 |
| Ty [lbf/100 sqrft] (Pa) | n.m.* | 22.5 (10.77) |
| Gel strength | | |
| 10-second gel [lbf/100 sqrft] (Pa) | n.m.* | 27 (12.93) |
| 10-min gel [lbf/100 sqrft] (Pa) | n.m.* | — |
| 1-min stirring [lbf/100 sqrft] (Pa) | n.m.* | 42 (20.11) |

*n.m stands for "Not Measureable" because the suspension was too pasty

Sample B1 was prepared by adding the blend comprising 650 g of class C fly ash and 62 g of sodium disilicate into 397 g of a solution made of water and 84 g of NaOH. Rheological properties after mixing, after conditioning at 25° C., gel strength evaluation were not measurable on sample B1 because of its paste consistency.

Sample B2 was prepared by adding the blend comprising 650 g of class C fly ash and 62 g of sodium disilicate into 397 g of a solution made of water, 84 g of NaOH and 6.5 g of sugar. Rheological properties after mixing, after conditioning at 25° C. and gel strength evaluation were measured on sample B2.

TABLE 5

Effect of adding 1.1% BWOA of low_viscosity carboxymethylcellulose into a geopolymeric suspension

| | Sample | |
|---|---|---|
| | B3 | B4 |
| Polysaccharide derivative salt | — | Sodium salt of carboxymethylcellulose (Low viscosity) |
| Rheology after mixing | | |
| PV [cP] | n.m.* | 100 |
| Ty [lbf/100 sqrft] (Pa) | n.m.* | 5 (2.39) |
| Rheology after conditioning | | |
| PV [cP] | n.m.* | 138 |
| Ty [lbf/100 sqrft] (Pa) | n.m.* | 5 (2.39) |
| Gel strength | | |
| 10-sec gel [lbf/100 sqrft] (Pa) | | 4 (1.91) |
| 10-min gel [lbf/100 sqrft] (Pa) | n.m.* | 9 (4.31) |
| 1-min stirring [lbf/100 sqrft] (Pa) | n.m.* | 4 (1.91) |

*n.m stands for "Not Measureable" because the suspension was too pasty

Sample B3 was prepared by the subsequent addition of 167 g of 10 M solution of sodium hydroxide and the blend comprising 569 g of Fly ash class C, 53.5 g of sodium disilicate into 235 g of water. Rheological properties after mixing, after conditioning at 25° C., gel strength evaluation were not measurable on sample B3 because of its pasty consistency.

Sample B4 was prepared by the pre-dissolution of 6.3 g of low-viscosity carboxymethylcellulose in 235 g of water and subsequent addition into this solution of 167 g of 10 M solution of sodium hydroxide and the blend comprising 569 g of Fly ash class C, 53.5 g of sodium disilicate. Rheological properties after mixing, after conditioning at 25° C. and gel strength evaluation were measured on sample B3.

Carbohydrate-based additive can be chemically modified and included inside a formulation. Table 6 hereunder illustrates that addition of sodium glycero-glucoheptonate provides mixable and settable suspensions, and rheological properties and stability suitable for cementing subterranean zones. Samples C2 and C3 were prepared by adding respectively 0.5% and 1% BWOA of sodium glycero-glucoheptonate into sample C1.

TABLE 6

Influence of a saccharide-based additive on the rheological properties and stability of a geopolymeric suspension at a bottom hole circulating temperature of 85° C.

| | Sample | | |
|---|---|---|---|
| | C1 | C2 | C3 |
| Sodium glycero-glucoheptonate | 0 | 0.5% BWOA | 1% BWOA |
| Rheology after mixing | | | |
| PV [cP] | 35 | 18 | 22 |
| Ty [lbf/100 sqrft] (Pa) | 15 (7.18) | 2.7 (1.29) | 2.3 (1.1) |
| Rheology after conditioning | | | |
| PV [cP] | 45 | 26.7 | 26 |
| Ty [lbf/100 sqrft] (Pa) | 17 (8.14) | 8 (3.83) | 7 (3.35) |
| Gel strength | | | |
| 10-second gel [lbf/100 sqrft] (Pa) | 8 (3.83) | 9 (4.31) | 7 (3.35) |
| 10-min gel [lbf/100 sqrft] (Pa) | 16 (7.66) | 13 (6.22) | 9 (4.31) |
| 1-min stirring [lbf/100 sqrft] (Pa) | 11 (5.27) | 11 (5.27) | 7 (3.35) |
| Free fluid [mL] | 0 | 0 | 0 |

Sample C1 was prepared by adding the blend comprising 562 g of class C fly ash and 54 g of sodium disilicate into 391 g of a solution made of water and 36 g of NaOH. Rheological properties after mixing at 25° C., after conditioning at 85° C., gel strength evaluation and stability were measured on sample C1.

Sample C2 was prepared by adding the blend comprising 570 g of class C fly ash and 54 g of sodium disilicate into 390 g of a solution made of water, 36 g of NaOH and 2.8 g of sodium glycero-glucoheptonate. Rheological properties after mixing at 25° C., after conditioning at 85° C., gel strength evaluation and stability were measured on sample C2.

Sample C3 was prepared by adding the blend comprising 562 g of class C fly ash and 54 g of sodium disilicate into 393 g of a solution made of water, 36 g of NaOH and 5.6 g of sodium glycero-glucoheptonate. Rheological properties after mixing at 25° C., after conditioning at 85° C., gel strength evaluation and stability were measured on sample C3. Furthermore, thickening time was performed according to the API schedule 9.8 in a pressurized consistometer at 85° C. The suspension showed right angle set consistency increase (30 Bc in 5 h 56 min and 100 Bc in 6 h 14 min). This confirms that the suspension is pumpable inside a well bore and sets under downhole conditions.

In another embodiment, concentration of the carbohydrate-based additive can be varied in order to adjust rheological properties of the geopolymeric suspension depending on the application. Table 7 hereunder illustrates that addition of different concentrations of glucose influences rheological properties and stability of the geopolymeric suspension. Rheological properties of the suspension without additive (sample D1) were not measurable, because of its pasty consistency. Samples D2 and D3 were prepared respectively by adding 1% and 1.5% BWOA of glucose into sample D1. It was shown that by varying the concentration of the additive, rheological properties were varied, and therefore can be controlled.

TABLE 7

Control of the rheological properties of the suspension by varying the concentration of the additive

| | Sample | | |
|---|---|---|---|
| | D1 | D2 | D3 |
| Glucose concentration | 0 | 1% BWOA | 1.5% BWOA |
| Rheology after mixing | | | |
| PV [cP] | n.m.* | 78 | 91 |
| Ty [lbf/100 sqrft] (Pa) | n.m.* | 13.5 (6.46) | 11.2 (5.36) |
| Rheology after conditioning | | | |
| PV [cP] | n.m.* | 112 | 211 |
| Ty [lbf/100 sqrft] (Pa) | n.m.* | 5.7 (2.73) | 9.7 (4.64) |
| Gel strength | | | |
| 10-second gel [lbf/100 sqrft] (Pa) | n.m.* | 7.5 (3.59) | 8.5 (4.07) |
| 10-min gel [lbf/100 sqrft] (Pa) | n.m.* | 32 (15.32) | 35 (16.76) |
| 1-min stirring [lbf/100 sqrft] (Pa) | n.m.* | 16 (7.66) | 11 (5.27) |

Sample D1 was prepared by adding the blend comprising 650 g of class C fly ash and 62 g of sodium disilicate into 397 g of a solution made of water and 84 g of NaOH. Rheological properties after mixing, after conditioning at 25° C., gel strength evaluation were not measurable on sample D1 because of its paste consistency.

Sample D2 was prepared by adding the blend comprising 642 g of class C fly ash, 61 g of sodium disilicate and 6.4 g of glucose into 392 g of a solution made of water, 83 g of NaOH. Rheological properties after mixing, after conditioning at 25° C. and gel strength evaluation were measured on sample D2.

Sample D3 was prepared by adding the blend comprising 650 g of class C fly ash, 62 g of sodium disilicate and 9.7 g of glucose into 390 g of a solution made of water, 84 g of NaOH. Rheological properties after mixing, after conditioning at 25° C. and gel strength evaluation were measured on sample D3.

In a further aspect, mixing aids and dispersing agents can be either predissolved in the carrier fluid or blended with the aluminosilicate source. Samples A1 and A3, as well as D1 and D2 above illustrate this property. It allows a degree of freedom for the entire process of using such additives including, for example, storage, transportation, and preparation of the suspension.

In yet a further aspect, carbohydrate-based compound is effective as dispersant in a wide range of temperature, i.e between 20° C. and 100° C., preferably between 20° C. and 85° C. In particular, this aspect makes this compound suitable for use in subterranean wells cementing, where rheology has to be controlled at various temperatures conditions. Previous examples above show that these additives are effective as dispersant at surface temperature and at bottom hole circulating temperature of 25° C. and 85° C. (Samples C1 to C3). Samples E1 to E3 illustrate further that saccharide-based additives still exhibit dispersing properties if the geopolymeric suspension is appropriately retarded. Sample E1, samples E2 and E3 also confirm that glucose improves the mixing and rheological properties of the suspension at room temperature. It also shows that preferred concentrations of the additive exists for the rheological properties and gel strength at the bottom hole circulating temperature of 85° C. Furthermore, the additive improves the stability of the suspensions by reducing free fluid. Samples E4 to E7 show that the rheological properties of a geopolymeric suspension containing a given concentration of low-viscosity carboxymethylcellulose. It both illustrates that the mixing aid is efficient at different temperature, but also that it is robust. Finally, for security reasons, as specified in ISO 10426-2 standard procedures, rheological measurements were done at a maximum temperature of 85° C. under atmospheric pressure. These examples therefore do not limit the efficiency of this additive to a maximum temperature of 85° C.

TABLE 8

Influence of glucose concentration on the rheological properties of geopolymeric suspension at a BHCT of 85° C.

| | Sample | | |
|---|---|---|---|
| | E1 | E2 | E3 |
| Glucose concentration | 0 | 1% BWOA | 3% BWOA |
| Rheology after mixing | | | |
| PV [cP] | n.m.* | 20 | 19 |
| Ty [lbf/100 sqrft] (Pa) | n.m.* | 1.2 (0.27) | 0.2 (0.09) |
| Rheology after conditioning | | | |
| PV [cP] | 84 | 37 | 35 |
| Ty [lbf/100 sqrft] (Pa) | 33.6 | 29 (13.88) | 29 (13.88) |
| Gel strength | | | |
| 10-second gel [lbf/100 sqrft] (Pa) | 13 | 8 (3.83) | 8 (3.83) |
| 10-min gel [lbf/100 sqrft] (Pa) | 28 | 21 (10.05) | 48 (22.98) |
| 1-min stirring [lbf/100 sqrft] (Pa) | 24 | 16 (7.66) | 58 (27.77) |
| Free fluid [mL] | 2 | 0 | 0 |

*n.m stands for "Not Measureable" because the suspension was too viscous after mixing Sample E1 was prepared by adding the blend comprising 562 g of class C fly ash and 53 g of sodium disilicate into 397 g of a solution made of water, 36 g of NaOH and 11 g of sodiumpentaborate decahydrated. Rheological properties after mixing at 25° C. were not measurable on sample E1 because of its paste consistency. Rheological properties after conditioning at 85° C., gel strength evaluation and stability were measured on sample E1.

Sample E2 was prepared by adding the blend comprising 562 g of class C fly ash and 53 g of sodium disilicate into 397 g of a, solution made of water, 36 g of NaOH, 11 g of sodiumpentaborate decahydrated and 5.6 g of glucose. Rheological properties after mixing at 25° C., after conditioning at 85° C., gel strength evaluation and stability were measured on sample E2. Furthermore, thickening time was performed according to the API schedule 9.8 in a pressurized consistometer at 85° C. The suspension shows right angle set consistency increase (30 Bc in 4 h 24 min and 100 Bc in 4 h 48 min). This confirms that the suspension was pumpable inside a well bore and sets under downhole conditions.

Sample E3 was prepared by adding the blend comprising 562 g of class C fly ash and 53 g of sodium disilicate into 397 g of a solution made of water, 36 g of NaOH, 11 g of sodiumpentaborate decahydrated and 16.8 g of glucose. Rheological properties after mixing at 25° C., after conditioning at 85° C., gel strength evaluation and stability were measured on sample E3.

TABLE 9

Influence of the BHCT on the rheological properties of a geopolymeric suspension containing similar content of carboxymethylcellulose.

| | Sample | | | |
|---|---|---|---|---|
| | E4 | E5 | E6 | E7 |
| Bottom hole circulating temperature [° C.] | 40 | 60 | 40 | 60 |
| Rheology after mixing | | | | |
| PV [cP] | n.m.* | n.m.* | 94 | 93 |
| Ty [lbf/100 sqrft] (Pa) | n.m.* | n.m.* | 10 (4.79) | 10 (4.79) |
| Rheology after conditioning | | | | |
| PV [cP] | 149 | 106 | 110 | 83 |
| Ty [lbf/100 sqrft] (Pa) | 14.5 (6.94) | 21.4 (10.25) | 2 (0.96) | 8 (3.83) |
| Gel strength | | | | |
| 10-second gel [lbf/100 sqrft] (Pa) | 29 (13.88) | 17 (8.14) | 2 (0.96) | 6 (2.87) |
| 10-min gel [lbf/100 sqrft] (Pa) | 38 (18.19) | 29 (13.88) | 20 (9.58) | 32 (15.32) |
| 1-min stirring [lbf/100 sqrft] (Pa) | 37 (17.72) | 23 (11.01) | 4 (1.91) | 15 (7.18) |

Samples E4 and E5 were prepared by the subsequent addition into the 235 g of water of 167 g 10 M solution of sodium hydroxide and the blend comprising 569 g of class C fly ash, 53.5 g of sodium disilicate. Because the suspensions were too viscous after mixing the rheological parameters were not measurable. Nevertheless the samples were transferred into the atmospheric consistometer cell. Rheological properties and gel strength evaluation after the conditioning were measured at 40 and 60° C. for the samples E4 and E5 respectively.

Samples E6 and E7 were prepared by the pre-dissolution of 6.3 g of low-viscosity carboxymethylcellulose in 235 g of water and subsequent addition into this solution of 167 g of a 10 M solution of sodium hydroxide and the blend comprising 569 g of class C fly ash, 53.5 g of sodium disilicate. Rheological properties after mixing at 25° C., rheological properties, gel strength evaluation and stability after conditioning at 40° C. for sample E6 and 60° C. for sample E7 were measured.

In further embodiments, carbohydrate-based additives act as mixing enhancer and dispersing agent on geopolymeric suspensions having different molar compositions. In the previous examples, different sources of aluminosilicates and various amounts of additives are used, and therefore geopolymeric suspensions have different $SiO_2/Al_2O_3$, $Na_2O/SiO_2$, $Na_2O/Al_2O_3$ and $H_2O/SiO_2$ molar ratios. In all these examples, carbohydrate-based additives have shown their efficiency as mixing enhancer and dispersing agent. Samples F1 to F4 illustrate in more details that carbohydrate-based products improve the mixability, rheological properties and stability of geopolymeric suspensions having different $SiO_2/Al_2O_3$ molar ratios. Variation of this ratio is critical since, as known by people skilled in the art of geopolymer technology, mechanical properties of set geopolymers strongly correlate with it. Rheological properties of the suspension without additive were not measurable, because of their pasty consistency (samples F1 and F3). Samples F2 and F4 were prepared by adding respectively 1% BWOA of glucose into samples F1 and 3.

TABLE 10

Influence of the addition of 1% BWOA of glucose into geopolymeric suspensions having different $SiO_2/Al_2O_3$ molar ratios

| | Sample | | | |
|---|---|---|---|---|
| | F1 | F2 | F3 | F4 |
| $SiO_2/Al_2O_3$ molar ratio | 3.4 | 3.4 | 3.8 | 3.8 |
| Glucose concentration | 0 | 1% BWOA | 0 | 1% BWOA |
| Rheology after mixing | | | | |
| PV [cP] | n.m.* | 73 | n.m.* | 160 |
| Ty [lbf/100 sqrft] (Pa · s) | n.m.* | 8 (3.83) | n.m.* | 27 (12.93) |
| Rheology after conditioning | | | | |
| PV [cP] | n.m.* | 118 | n.m.* | 250 |
| Ty [lbf/100 sqrft] (Pa) | n.m.* | 8 (3.83) | n.m.* | 11 (5.27) |
| Gel strength | | | | |
| 10-second gel [lbf/100 sqrft] (Pa) | n.m.* | 10 (4.79) | n.m.* | 12 (5.75) |
| 10-min gel [lbf/100 sqrft] (Pa) | n.m.* | 36 (17.24) | n.m.* | 64 (30.64) |
| 1-min stirring [lbf/100 sqrft] (Pa) | n.m.* | 23 (11.01) | n.m.* | 26 (12.45) |
| Free fluid [mL] | n.m.* | 0 | n.m.* | 0 |

*n.m stands for "Not Measureable" because the suspension was too viscous after mixing Sample F1 was prepared by adding the blend comprising 650 g of class C fly ash and 62 g of sodium disilicate into 391 g of a solution made of water and 78 g of NaOH. Rheological properties after mixing, after conditioning at 25° C., gel strength evaluation and stability were not measurable on sample F1 because of its pasty consistency.

Sample F2 was prepared by adding the blend comprising 650 g of class C fly ash, 62 g of sodium disilicate and 6.5 g of glucose into 388 g of a solution made of water and 72 g of NaOH. Rheological properties after mixing, after conditioning at 25° C., gel strength evaluation and stability were measured on sample F2.

Sample F3 was prepared by adding the blend comprising 660 g of class C fly ash and 117 g of sodium disilicate into 357 g of a solution made of water and 72 g of NaOH. Rheological properties after mixing, after conditioning at 25° C., gel strength evaluation and stability were not measurable on sample F3 because of its pasty consistency.

Sample F4 was prepared by adding the blend comprising 660 g of class C fly ash, 117 g of sodium disilicate and 6.6 g of glucose into 353 g of a solution made of water and 72 g of NaOH. Rheological properties after mixing, after conditioning at 25° C., gel strength evaluation and stability were measured on sample F4.

Embodiments also relate to the application of the carbohydrate-based compound as water-reducing agent, which allows higher solid-to-fluid ratio while maintaining rheological properties and stability required for placement. Solid comprise the ones used in the geopolymeric suspension (aluminosilicates, activators) and alternative fillers, such as lightweight particles or weighting particles. If only aluminosilicate and/or activator content is increased, use of carbohydrate-based additive allow increasing density of the fluid suspension, while maintaining its pumpability property. Samples G1 and G2 illustrates that the addition of 2% BWOA of glucose allows a 1.9 SG (Specific Gravity) geopolymeric suspension to be mixable and pumpable. If alternative fillers are used, density can thus be decreased (by using for example lightweight particles) or increased (by using weighting agent). By partially decoupling solid content and rheology of the suspension, application of carbohydrate-based additive as water-reducing agent allows varying the density of the geopolymer suspension and decreasing the permeability of the set geopolymer, which are two critical properties required in well cementing applications.

| | Sample | |
|---|---|---|
| | G1 | G2 |
| Specific gravity of the suspension | 1.9 | 1.9 |
| Glucose concentration | 0 | 2% BWOA |
| Rheology after mixing | | |
| PV [cP] | n.m.* | 164 |
| Ty [lbf/100 sqrft] (Pa) | n.m.* | 14 (6.70) |
| Rheology after conditioning | | |
| PV [cP] | n.m.* | 269 |
| Ty [lbf/100 sqrft] (Pa) | n.m.* | 4.3 (2.06) |
| Gel strength | | |
| 10-second gel [lbf/100 sqrft] (Pa) | n.m.* | 4.3 (2.06) |
| 10-min gel [lbf/100 sqrft] (Pa) | n.m.* | 28 (13.41) |
| 1-min stirring [lbf/100 sqrft] (Pa) | n.m.* | 13 (6.22) |
| Free fluid [mL] | n.m.* | 0 |

*n.m stands for "Not Measureable" because the suspension was too viscous after mixing Sample G1 was prepared by adding the blend comprising 660 g of class C fly ash and 164 g of sodium disilicate into 314 g of a solution made of water and 50 g of NaOH. Rheological properties after mixing, after conditioning at 25° C., gel strength evaluation and stability were not measurable on sample G1 because of its pasty consistency.

Sample G2 was prepared by adding the blend comprising 650 g of class C fly ash supplied by Boral, 161 g of sodium disilicate and 13 g of glucose into 311 g of a solution made of water and 50 g of NaOH. Rheological properties after mixing, after conditioning at 25° C., gel strength evaluation and stability were measured on sample G2.

In further embodiments, the carbohydrate-based additive exhibits dispersing properties whatever the source of aluminosilicate used in the geopolymer suspension. Indeed, example above are mainly obtained on class C fly ash, while the following examples show this property on metakaolin and class fly ash geopolymer. Table 11 hereunder illustrates that addition of sodium gluconate improves the rheological properties of a metakaolin-based suspension. Samples H2 and H3 were prepared by adding respectively 0.094% and 0.36% BWOA of this additive into sample H1. Table 12 hereunder illustrates that addition of the same additive improved the rheological properties (especially the yield stress) of a class fly ash-based suspension. Samples I2 and I3 were prepared by adding respectively 0.06% and 0.18% BWOA of this additive into sample I1.

TABLE 11

Influence of a sodium gluconate on the rheological properties of a gepolymeric suspension prepared from metakaolin measured at a temperature of 25° C.

| | Sample | | |
|---|---|---|---|
| | H1 | H2 | H3 |
| Sodium gluconate concentration | 0 | 0.09% BWOA | 0.36% BWOA |
| Rheology after mixing | | | |
| PV [cP] | 128 | 114 | 108 |
| Ty [lbf/100 sqrft] (Pa) | 17 (8.14) | 8 (3.83) | 9 (4.31) |

Sample H1 was prepared by adding the blend comprising 100 g of metakaolin supplied by Imerys™ and 72.5 g of sodium disilicate supplied by PQ Europe™ into a solution made of 112.5 g of water, 5.5 g of NaOH and 2.6 g of sodium pentaborate decahydrated. Rheological properties after mixing at 25° C. were measured on sample H1.

Sample H2 was prepared by adding the blend comprising 100 g of metakaolin supplied by Imerys™ and 72.5 g of sodium disilicate supplied by PQ Europe™ into a solution made of 112.6 g of water, 5.5 g of NaOH, 2.6 g of sodium pentaborate decahydrated and 0.38 g of sodium gluconate. Rheological properties after mixing at 25° C. were measured on sample H2.

Sample H3 was prepared by adding the blend comprising 100 g of metakaolin supplied by Imerys™ and 72.5 g of sodium disilicate supplied by PQ Europe™ into a solution made of 112.5 g of water, 5.5 g of NaOH, 2.6 g of sodium pentaborate decahydrated and 1.5 g of sodium gluconate. Rheological properties after mixing at 25° C. were measured on sample H3.

TABLE 12

Influence of a sodium gluconate on the rheological properties of a gepolymeric suspension prepared from class F fly ash measured at a temperature of 25° C.

| | Sample | | |
|---|---|---|---|
| | I1 | I2 | I3 |
| Sodium gluconate concentration | 0 | 0.06% BWOA | 0.18% BWOA |
| Rheology after mixing | | | |
| PV [cP] | 310 | 275 | 240 |
| Ty [lbf/100 sqrft] (Pa) | 35 (16.76) | 7 (3.35) | 1 (0.48) |

Sample I1 was prepared by adding the blend comprising 100 g of class fly ash supplied by Scotash™ and 20 g of sodium disilicate into a solution made of 66.2 g of water and 18.5 g of NaOH. Rheological properties after mixing at 25° C. were measured on sample I1.

Sample I2 was prepared by adding the blend comprising 100 g of class fly ash supplied by Scotash™ and 20 g of sodium disilicate into a solution made of 66.2 g of water, 18.5 g of NaOH and 0.25 g of sodium gluconate. Rheological properties after mixing at 25° C. were measured on sample I2.

Sample I3 was prepared by adding the blend comprising 100, g of class fly ash supplied by Scotash™ and 20 g of sodium disilicate into a solution made of 66.2 g of water, 18.5 g of NaOH and 0.75 g of sodium gluconate. Rheological properties after mixing at 25° C. were measured on sample I3.

When the geopolymer compositions are utilized for cementing subterranean zones penetrated by well bores, they can also include a variety of other additives. For example, the geopolymer compositions can include weighting materials, set retarding additives, set accelerators, fluid loss additives, strength stabilizers, strength enhancers, lightweight additives, anti-gas migration additives, defoamers, foamers, expansion additives and the like.

In a further aspect a method to place a geopolymeric composition in a borehole and isolate subterranean formations is disclosed, the method comprises the step of: (i) predissolving the carbohydrate-based compound in the carrier fluid or (i') blending the Carbohydrate-based compound with the aluminosilicate source.

In embodiments, the method comprises the step of (ii) pumping said suspension into the borehole, and (iii) allowing said suspension to set under wellbore downhole conditions and thereby form the geopolymeric composition.

In further embodiments, the step of providing a suspension of said geopolymeric composition comprises adding a retarder and/or an accelerator and/or an activator. Effectively, it can be useful to lengthen the set of the geopolymeric composition by adding a retarder as seen above and/or it can be useful to accelerate the set of the geopolymeric composition by adding an accelerator as seen above.

Still, in further embodiments, the method comprises the step of activating in situ the suspension of said geopolymeric composition. In fact, the method also applies if activation has to be realized downhole in the well, the activation does not necessarily refer to the alkali activator. Effectively, in a first embodiment the activation refers to activation via the alkali activator, the alkali activator is encapsulated as described previously or is released with a downhole device. In a second embodiment, the activation refers to any type of activation when various additives that need activation are used, as for example activation can be physical (by heat, UV radiation or other radiations); the activation can be made also with chemical components encapsulated and released at a predefined time or event. The capsule can be self destructed as previously explained or can be destroyed with help of stress and/or sonic perturbation.

In embodiments, the geopolymeric composition is retarded with a sufficiently long setting time so as an activation has to be done to trigger the setting of geopolymeric composition. The activation is achieved by the release of an activator. This release is achieved downhole, in situ, by adding the activator directly to the suspension of said geopolymeric composition and/or if the activator is encapsulated in the suspension of said geopolymeric composition by break of the capsules.

Still, in yet further embodiments, the method comprises the step of activating the suspension of said geopolymeric composition just before use. For example, an inactivated suspension of geopolymer composition is made so that said suspension is stable for a long period of time. Said composition is storable, transportable and accessorily perishable after a period varying between one day and some months, preferably some days and three months. The storable suspension is taken to rig site in liquid form and is activated before pumping or downhole in situ as explained previously.

Preferably, the step of pumping the suspension of said geopolymeric composition is made with conventional well cementing equipment, familiar to those skilled in the art. The method applies as a primary cementing technique for cementing wells where the geopolymeric composition is pumped down a pipe until the shoe where it then flows up the annular space between the casing/liner and the borehole. A reverse circulation cementing technique can also be used for placing the geopolymer suspension at the desired depth in the borehole.

Further, the pumping and placement of geopolymer suspension below surface encompasses several other conventional cementing techniques such as the grouting of platform piles, skirts or the like, the squeeze operation for repair or plugging of an undesired leak, perforation, formation or the like, and the setting of a geopolymer composition plug for any purpose of a cement plug.

The methods also apply to the placement of the geopolymeric composition to squeeze a zone of the borehole. The methods can apply for water well, geothermal well, steam injection well, Toe to Heel Air Injection well or acid gas well. As such the composition can withstand temperature above 250° C., even above 450° C. and 550° C.

The geopolymer additive of the present invention can adjust the viscosity of such compositions in a wide temperature range so as to facilitate the works at the sites of handling the same and to allow placement of this composition in a wellbore. The geopolymer additive of the present invention can further improve the water-reducing ability of geopolymer-based suspensions, enhance the strength and durability and decrease the permeability of hardening products produced therefrom. The above-mentioned geopolymer additive comprises a carbohydrate-based compound. The above-mentioned geopolymer suspensions find various applications such as ceramic precursor, coatings and cementing materials including in operations for the oilfield industry.

The invention claimed is:

1. A method for using a carbohydrate-based compound as a mixing aid or a dispersing agent or both in a pumpable geopolymeric suspension for oil or gas industry applications or both, said suspension further comprising an aluminosilicate source, a carrier fluid, and an activator;
wherein the carbohydrate-based compound is sucrose, xylose, glucose, pentose hexose, heptose, lactose, maltose, cellulobiose, sodium gluconate, calcium glucoheptonate, sodium glycero-glucoheptonate, or sodium carboxymethylcellulose.

2. The method according to claim 1, wherein the aluminosilicate source is fly ash.

3. The method of claim 1, wherein the carrier fluid is fresh water.

4. The method according to claim 1, wherein the activator is a silicate.

5. The method of claim 1, wherein the temperature of the pumpable geopolymeric suspension is between 4° C. and 150° C.

6. The method of claim 1, wherein the concentration of the carbohydrate-based compound is from 0.03% to 10% by weight of aluminosilicate.

7. The method of claim 1, The method of claim 1, wherein the suspension is used for primary cementing operations or remedial applications.

8. A method of placing a geopolymeric suspension comprising an aluminosilicate source, a carrier fluid, an activator and a carbohydrate-based compound as a mixing aid or a dispersing agent or both in a borehole, comprising:
(i) predissolving the carbohydrate-based compound in the carrier fluid; or
(ii) blending the carbohydrate-based compound with the aluminosilicate source;
wherein the carbohydrate-based compound is sucrose, xylose, glucose, pentose hexose, heptose, lactose, maltose, cellulobiose, sodium gluconate, calcium glucoheptonate, sodium glycero-glucoheptonate, or sodium carboxymethylcellulose.

9. The method according to claim 8, further comprising:
(iii) pumping said suspension into the borehole; and
(iv) allowing said suspension to set under wellbore downhole conditions.

10. The method of claim 8, wherein the activator is an alkaline agent.

11. A method of placing a geopolymeric suspension comprising an aluminosilicate source, a carrier fluid, an activator and a saccharide, a saccharide derivative or salt thereof as a mixing aid or a dispersing agent or both in a borehole, comprising:
(i) predissolving the carbohydrate-based compound in the carrier fluid; or
(ii) blending the carbohydrate-based compound with the aluminosilicate source;
wherein the carbohydrate-based compound is sucrose, xylose, glucose, pentose hexose, heptose, lactose, maltose, cellulobiose, sodium gluconate, calcium glucoheptonate, sodium glycero-glucoheptonate, or sodium carboxymethylcellulose.

12. The method of claim 11, wherein the carbohydrate based compound is present at a concentration of from 0.03% to 10% by weight of the aluminosilicate.

13. The method according to claim 8, wherein the carbohydrate-based compound is present at a concentration of from 0.03% to 10% by weight of the aluminosilicate source.

* * * * *